United States Patent
Quigley et al.

[11] Patent Number: 5,534,113
[45] Date of Patent: Jul. 9, 1996

[54] FORMING SOLUTIONS

[75] Inventors: Michael C. Quigley, Coventry, United Kingdom; Rainer F. Naef, Dietikon, Switzerland

[73] Assignee: Courtaulds Fibres (Holdings) Limited & Buss AG, London, United Kingdom

[21] Appl. No.: 410,035

[22] Filed: Mar. 23, 1995

Related U.S. Application Data

[63] Continuation of Ser. No. 121,308, Sep. 14, 1993, abandoned.

[30] Foreign Application Priority Data

Sep. 17, 1992 [GB] United Kingdom .................... 9219693

[51] Int. Cl.$^6$ ...................................... B01D 1/22
[52] U.S. Cl. ............................. 159/49; 159/6.1; 159/13.1; 159/DIG. 10; 159/DIG. 16; 203/14; 203/89; 536/55.3; 536/127
[58] Field of Search .............................. 159/49, 6.1, 13.1, 159/DIG. 10, DIG. 16, 25.2; 202/205, 236, 265; 203/14, 89; 536/55.3, 127, 56, 57

[56] References Cited

U.S. PATENT DOCUMENTS

| | | | |
|---|---|---|---|
| 2,817,155 | 12/1957 | Gilliam et al. ............................. | 159/49 |
| 2,863,888 | 12/1958 | Schurman ................................... | 159/49 |
| 2,866,499 | 12/1958 | Haley ........................................ | 159/49 |
| 3,554,263 | 1/1971 | Bachmann ............................... | 159/6.2 |
| 3,679,368 | 7/1972 | Balint et al. ..................... | 159/DIG. 10 |
| 3,695,327 | 10/1972 | Widmer .................................... | 159/6.2 |
| 3,812,897 | 5/1974 | Latinen ..................................... | 159/49 |
| 4,076,700 | 2/1978 | Harada et al. ......................... | 260/97.6 |
| 4,093,479 | 6/1978 | Baird ....................................... | 159/6.2 |
| 4,246,221 | 1/1981 | McCorsley, III ....................... | 264/203 |
| 4,581,072 | 4/1986 | Laity ........................................ | 106/176 |
| 4,599,143 | 7/1986 | Stage ........................................ | 159/49 |
| 4,981,554 | 1/1991 | Loconsolo et al. ..................... | 159/49 |
| 5,028,297 | 7/1991 | Bracken .................................. | 159/6.3 |
| 5,094,690 | 3/1992 | Zikeli et al. ............................ | 106/198 |

FOREIGN PATENT DOCUMENTS 1619737 1/1971 Germany ................................ 159/6.3

*Primary Examiner*—Virginia Manoharan
*Attorney, Agent, or Firm*—Howson and Howson

[57] ABSTRACT

A solution of cellulose is formed by moving a premix of a tertiary amine N-oxide, water and cellulose through a thin-film evaporator using a bladed rotor under treatment conditions which specify, inter alia, an area of heated surface (1 m$^2$ to 125 m$^2$), a blade speed (2.5 to 8 m/sec), a pressure (25 to 100 mb) and a temperature (90° to 135° C.).

9 Claims, 6 Drawing Sheets

FORMING SOLUTIONS

This is a continuation of U.S. patent application Ser. No. 08/121,308, filed Sep. 14, 1993, now abandoned.

BACKGROUND OF THE INVENTION

1. Field of the Invention

This invention relates to a method of forming solutions and has particular reference to forming solutions of cellulose in tertiary amine N-oxide solvents.

2. Description of the Related Art

For many years shaped cellulose products such as fibres have been produced from cellulose by the formation of a cellulose compound which can be processed. Typically, the cellulose compound is cellulose xanthate.

More recently, proposals have been made to form shaped cellulose articles by forming true solutions of cellulose in a solvent and spinning the solvent to form a fibre or film.

A preferred form of solvent is a tertiary amine N-oxide, typically N-methylmorpholine N-oxide. Although cellulose can be dissolved in such cyclic compounds, it has proved difficult to dissolve it at rates which are commercially acceptable.

In U.S. Pat. No. 4,246,221 there is described a process for forming a true solution of cellulose in which there is prepared a premix of cellulose, a solvent such as a tertiary amine N-oxide and a non-solvent for cellulose such as water. A premix of the three components is made, and on heating the premix to evaporate the water, a true solution can be formed.

The U.S. patent referred to above describes forming the solution particularly by heating the mixture in an extruder. There is however description of alternative various types of equipment, in particular thin-film evaporators. Thin-film evaporators are well known as being suitable for the evaporation of moisture or liquid from a viscous solution. The premix of cellulose solvent and non-solvent is a viscous mixture.

An unusual aspect of the process of heating the premix and evaporating the water is that the result is to form a true solution of cellulose in the amine oxide. This solution is quite viscous—having a viscosity of typically 50,000 to 10,000,000 centipoise—and is more viscous than the premix which is the starting material. Thus, the resultant product from the thin-film evaporator has a higher viscosity than the starting material but is a true liquid whereas the premix is not. In normal operations the evaporation of a product from a material tends to result in the production of a solid as the material is processed.

For the production of a solution capable of being spun into fibres it is necessary to form a solution containing very little, if any, undissolved cellulose. It will be appreciated that the solution is formed into fibres by being spun or extruded through a jet plate containing many fine-diameter holes. Typically, the holes will have a diameter of 250 microns or less. Such holes quickly become blocked if the product passing through them is not a true solution.

Although the use of a thin-film evaporator is described in U.S. Pat. No. 4,246,221 and is illustrated in EP-A-0,356,419, it has been discovered that there are economic problems associated with the scaling-up of the process for forming a true solution from a laboratory-scale to a large commercial-scale system.

Laboratory-scale thin-film evaporators having four blades and a heated surface area of about 0.5 $m^2$ have been found readily to produce a solution in accordance with the teachings of U.S. Pat. No. 4,246,221 and as illustrated in EP-A-0,356,419.

On attempting to carry out the same process utilising thin-film evaporators having a heated surface area of 1 $m^2$ or above it has been found that a large increase in electrical (or rotor-induced) energy is required to obtain a complete solution of commercially viable quantities of the cellulose in the tertiary amine N-oxide. As the rate of production of solution is increased, there is a disproportionate increase in energy consumption.

A thin-film evaporator comprises an evacuable vertically oriented cylinder heated on the outside and containing a central rotatable shaft provided with paddle blades which distribute the material to be heated over the internal surface of the cylinder. As the central shaft is rotated the material passes down the evaporator, under the combined action of gravity and the paddles, to be subjected to heat and a vacuum within the thin-film evaporator. At the lower end of the cylinder the heated and processed material is removed by any suitable means. The normal arrangement for the paddles is to provide them in four vertical rows spaced at 90° around the central shaft.

It has now been discovered that with larger thin-film evaporators (by which is meant thin-film evaporators having a heated surface area in excess of 1 $m^2$) it is not possible to operate such a thin-film evaporator as described in the prior art in a method which will produce a satisfactory true solution of cellulose in tertiary amine N-oxide at an energy consumption rate in kilowatt hours of consumption per kg per $m^2$ (kw/kg/m2) which is economic.

SUMMARY OF THE INVENTION

By the present invention there is provided a method of forming a solution of cellulose in a tertiary amine N-oxide which comprises the steps of: forming a premix of a tertiary amine N-oxide, water and cellulose, heating the premix under a pressure lower than atmospheric in a vertically mounted thin-film evaporator having a heated inner surface and a central shaft with paddle blades disposed along the shaft so that, on rotation of the shaft, material in the evaporator will be contacted by two or more blades, evaporating the water from the premix to a level such that the cellulose forms a solution in the amine oxide and removing the solution from the thin-film evaporator, characterised in that the heated surface has an area in the range 5.5 $m^2$ to 125 $m^2$, the rotor is rotated at a speed in the range 40 to 100 rpm, a gap is provided between the tips of adjacent blades in the range of 65 mm to 175 mm, a vacuum in the range 25 millibars to 100 millibars is applied and the heated surface is heated to a temperature such that, under the conditions of applied vacuum, the solution is removed at a temperature in the range 100° to 135° C.

Suitably the surface area is in the range 10 $m^2$ to 125 $m^2$ preferably 10 $m^2$ to 75 $m^2$ and the blade gap is preferably in the range 75 mm to 150 mm.

Preferably the rotor blades are located at intervals of 5° to 15° or 5° to 10° around the circumference of the rotor.

The paddle blades may be symmetrically or asymmetrically arranged about the central shaft. The paddle blades may be disposed in sets vertically spaced along the shaft. Each set may have the same number of blades, or the upper half of the shaft may have more blades than the lower half, or alternatively the blade density may be varied along the shaft.

The blades may be spirally arranged about the shaft with adjacent blades being angularly and axially spaced from one another.

The blades may be fixed blades and may be provided with teeth.

The blades may be aligned in the same direction as the rotational axis of the shaft, or may be inclined so as to force material downwards through the thin-film evaporator.

The central shaft may conveniently be revolved at a speed in the range 40 to 75 revolutions per minute (RPM). A linear speed of the tips of the blades in the range 2.5 to 6.25, preferably 2.5 to 4.7, meters/second would be typical.

The tertiary amine N-oxide is preferably a cyclic mono(N-methyl amine™ N-oxide) such as N-methylmorpholine N-oxide.

Suitably the solution is manufactured at an exit temperature in the range 100° C. to 110° C. Conveniently the premix is fed into the thin film evaporator at a temperature between ambient and 85° C., preferably between 75° C. and 85° C.

The cellulose preferably has been derived from wood but may have been derived from cotton linters or other suitable cellulosic sources.

Preferably the solution contains 7% to 35% by weight cellulose, 15% to 4% water and the balance amine oxide.

The central shaft may be hollow and may be provided with integrally formed projecting blade root members to which the blades may be attached. The blades may comprise strips with integrally formed teeth. The teeth may comprise 10 to 40% of the vertical length of the strip.

BRIEF DESCRIPTION OF THE DRAWINGS

By way of example embodiments of the present invention will now be described with reference to the accompanying drawings, of which.

DESCRIPTION OF PREFERRED EMBODIMENTS

Figure 1:
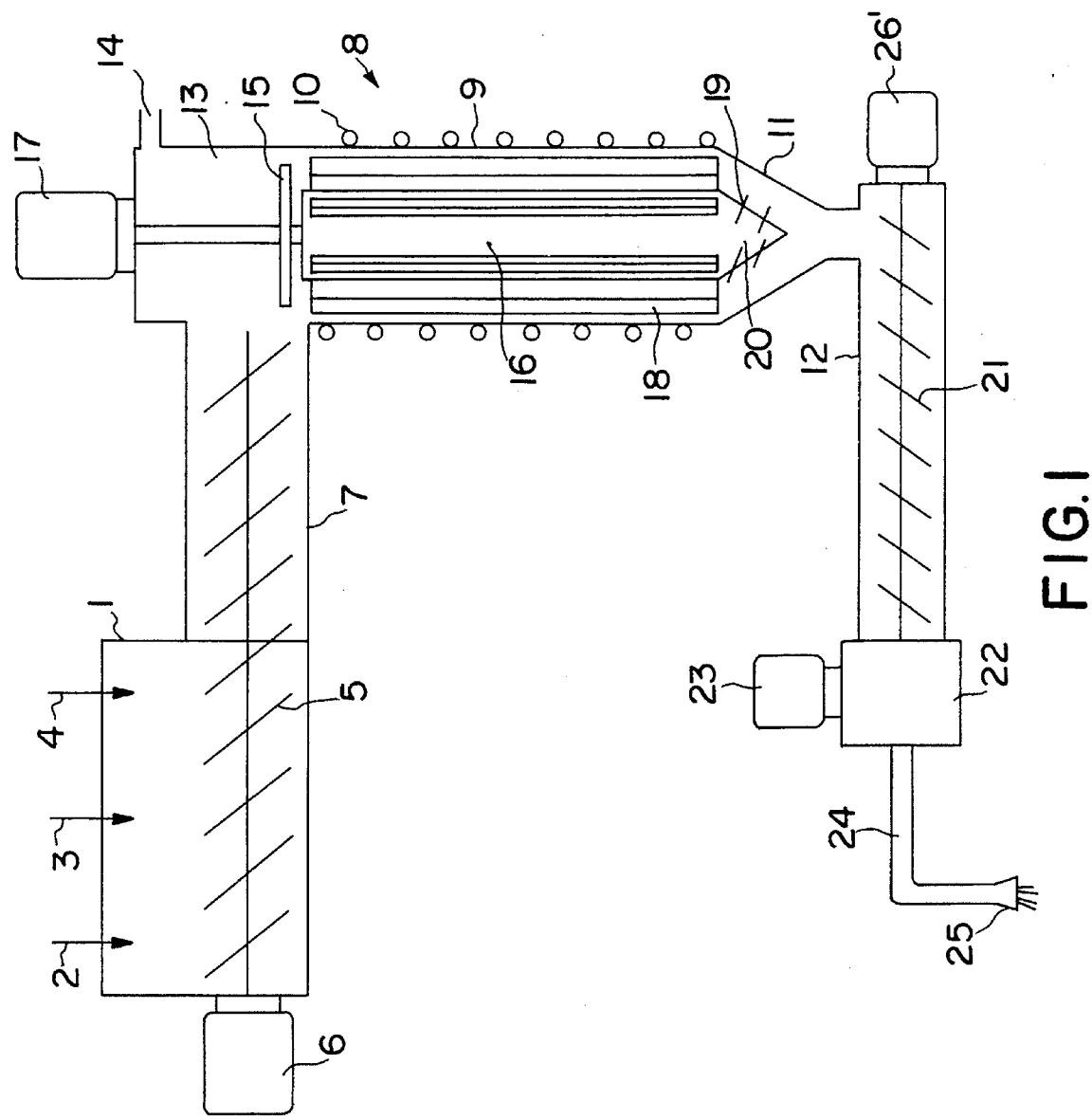
FIG. 1 is a schematic sectional view of a system in accordance with the present invention.

Referring to FIG. 1, this shows schematically a system for performing the process of forming a cellulose solution in a tertiary amine N-oxide.

A tertiary amine N-oxide, such as N-methylmorpholine N-oxide, is fed into a container 1 along line 2. Feed lines are also provided for cellulose, 3, and water, 4. Typically, the premix formed by mixing these components contains 10% by weight of cellulose, 50% by weight of water and 40% by weight of N-methylmorpholine N-oxide. The three components are mixed in the container 1 by means of a paddle screw 5 rotated by an electric motor 6. The paddle screw agitates the mixture and passes the mixed components along a pipeline 7 to a thin-film evaporator indicated generally by 8. The pipeline preferably has a diameter such that it is always full, otherwise a restriction may be provided in its outlet into the thin film evaporator, so that material in the pipeline 7 is not exposed to the vacuum in the evaporator 8.

A preferred form of premixer is described in co-pending application U.S. Ser. No. 08/066,781, filed May 24, 1993, the contents of which are incorporated herein by way of reference.

The mixture may be conveyed by a reciprocating pump as described in co-pending application Ser. No. 08/067,430 filed May 24, 1993, the contents of which are incorporated herein by way of reference.

The thin-film evaporator 8 comprises a rotor within a cylindrical member 9 which is heated on the outside by means of a heating element 10. The heating element may be an electrical heating element, or an oil-filled element, or a complete steam-filled or hot-water-filled heating jacket. At the lower end of the cylindrical portion 9 there is a tapered portion 11 leading to a discharge line 12.

At the upper end of the cylindrical portion 9 there is a feed chamber 13 provided with an exit duct 14 through which evaporated vapours may be removed. Premixed material passes into the chamber 13 through the pipeline 7 and is distributed around the thin-film evaporator by a distributor plate 15 on rotation of the rotor, indicated generally by 16.

The central shaft of the rotor 16 is rotated by means of an external electric motor 17.

The rotor 16 is provided with a series of blades 18 which are described in more detail below. In operation, a reduced pressure is applied through the duct 14, whereby, on heating of the premix by means of the heating element 10, the water is evaporated during operation of the thin-film evaporator to reduce the water content of the premix as it is heated.

A description of a thin film evaporator, trademark Filmtruder is to be found in Devolatalisation of Plastics, English translation by S. Welling, published by VDI-Verlag GmbH, Düsseldorf 1980, pp69–97, the contents of which are incorporated herein by way of reference.

This continuous heating and evaporation results in a lowering of the water, i.e. the non-solvent, component in the premix to such an extent that the cellulose forms a true solution in the tertiary amine N-oxide.

In the lower portions of the thin-film evaporator 8, therefore, there is formed a viscous solution which is pushed downwards by inclined blades 19 on a conical member 20 into the neck at the bottom of the tapered portion 11 of the thin-film evaporator. By rotation of a screw member 21 the solution of cellulose in solvent is passed to a pump 22 driven by an electric motor 23. From there the solution is passed by means of suitable pipework 24 to a spin nozzle 25.

The screw member 21 is rotated by means of an electric motor 26', and control of the electric motor 26' in conjunction with control of the electric motors 6 and 17 controls the flow of solution through the system.

Figure 2:
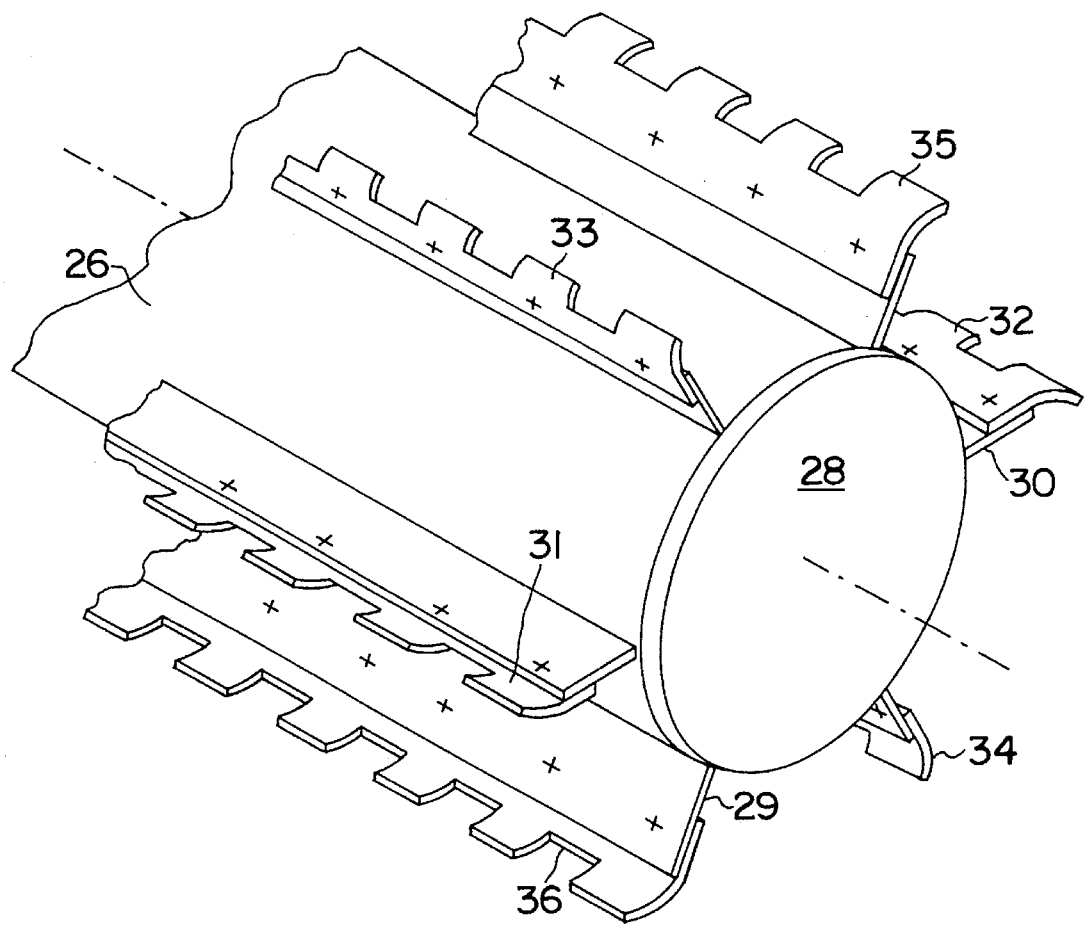
FIG. 2 is an end view of the top of the rotor of the system shown in FIG. 1.
Figure 3:
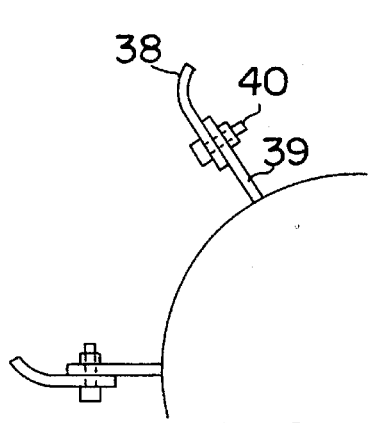
FIG. 3 is a more detailed view of a blade to rotor connection.
Figure 4:
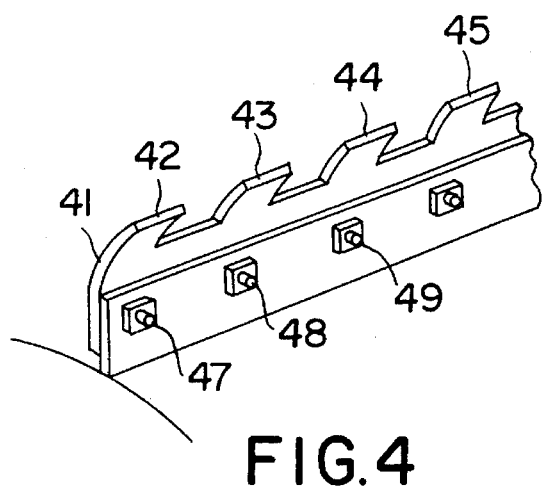
FIG. 4 is a perspective view of the arrangement of FIG. 3.

FIGS. 2 to 4 show in more detail the structure of the rotor illustrated generally at 16 in FIG. 1. It can be seen from FIGS. 2 and 3 that the rotor comprises a cylindrical central portion 26 having at its lower end a tapered conical portion. At its upper end the cylindrical portion has a terminating plate 28 to which the rotational shaft from motor 15 is connected.

The rotor central portion 26 is essentially a hollow cylinder having integrally projecting from it a series of six parallel blade roots 29, 30 etc. These blade roots extend the length of the central portion 26 of the rotor. The blade roots are welded to and form an integral portion of the central region of the rotor.

Bolted to the roots such as root 30 are a series of plates 31,32,33,34,35 and 36 which form the actual blades of the thin-film evaporator. As is shown more clearly in FIG. 3, a blade plate 38 is bolted to a blade root 39 by means of a conventional bolt 40. As can be seen in FIG. 4, a blade plate 41 has a series of teeth members 42,43,44 and 45 which extend to the far edges of the blade plate 41 and the blade plate 41 is secured to a blade root 46 by means of bolts 47,48 and 49.

The blade teeth 42 to 45 may be angled to push the viscous premix and viscous solution downwards through the thin-film evaporator. Because the rotor 16 of the thin-film evaporator 8 is arranged in a vertical disposition, the action of the inclined blades cooperates with the action of gravity to enhance movement of the premix and solution downwards through the evaporator.

Figure 5:
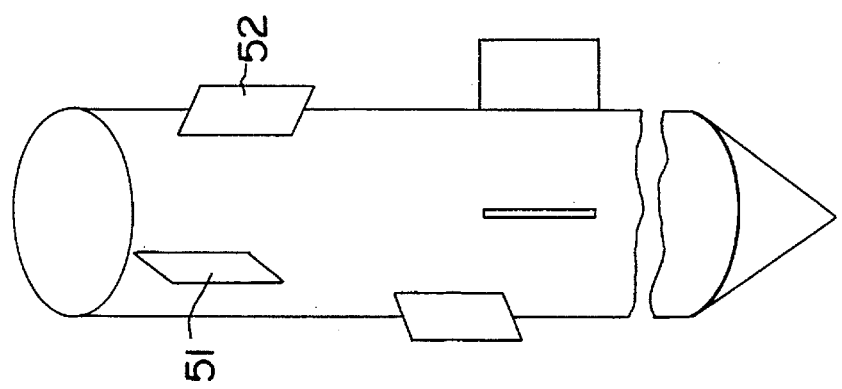
FIG. 5 is a schematic view of an alternative structure of rotor.

As is shown schematically in FIG. 5, the blades on the central rotor portion may be staggered around the rotor rather than being in straight lines as is shown in FIGS. 1 to 4. In the case of the rotor shown in FIG. 5 a blade 51 is located axially and angularly spaced from its nearest adjacent blade 52. In the case of staggered paddle blades, as is shown in FIG. 5, the angle between the blades should be no more than 60°.

In EP-A-0,356,419 referred to above, it is indicated that the thin-film evaporator should incorporate four paddle wheels located around a small-diameter central shaft, there being a large region in the centre of the evaporator in which the cellulose may mix with the solvent and non-solvent.

It has been found, however, that scaling-up the apparatus, whilst still using four blades in the thin-film evaporator, results in a large and uneconomic increase in the unit costs for the formation of a true solution of cellulose in the solvent. It might have been thought that the rotor in the evaporator was not operating quickly enough to form a true solution. On manufacture, therefore, of a thin-film evaporator having a surface area in excess of 1 m², attempts were made to increase the rotational speed of the central rotor, so as to increase the number of wipes per minute experienced by the premix to increase the rate of formation of solution. However, this increased the unit cost significantly.

Figure 6B:
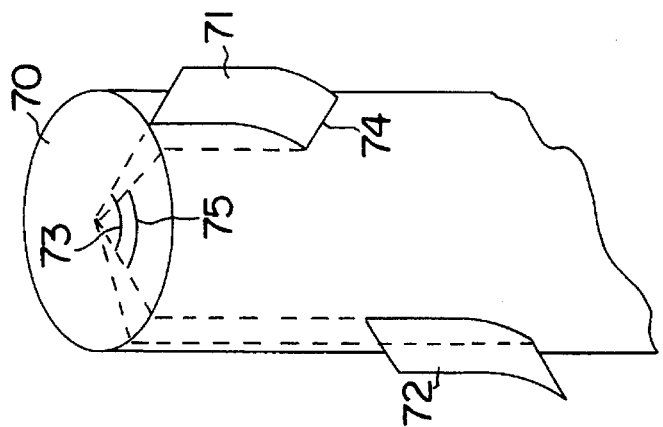
FIGS. 6a and 6b are schematic perspective views of different rotor designs.
Figure 6A:
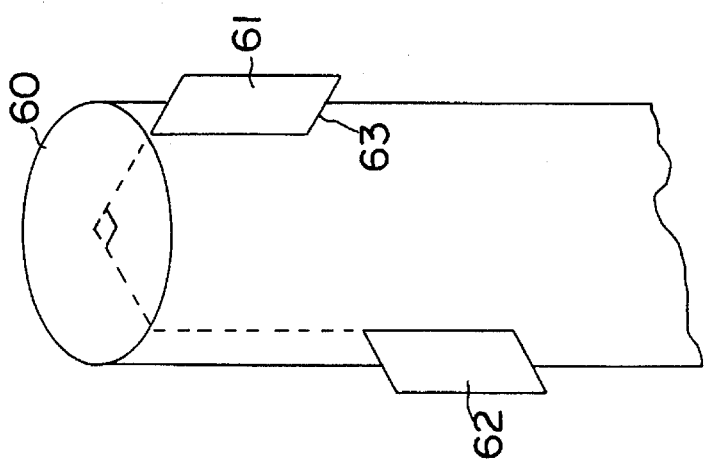

A series of tests was, therefore, carried out using a different number of rotor blades on the rotor rather than increasing the speed of rotation of the central rotor. For ease of understanding how the number of rotor blades on a rotor can be varied, it is desirable to refer to FIGS. 6a and 6b which are schematic cross-sections of portions of a rotor. In FIG. 6a a central rotor shaft 60 carries a pair of flat rotor blades 61,62 which are disposed at an angle of 90° to one another. The blade 61 would have an opposing blade at the other end of its diameter and the blade 62 would also have an opposing blade at the other end of its diameter. Thus as the rotor 60 was rotated the material in the thin-film evaporator would first be agitated by blade 61. The blades 61 and 62 are shown in a vertically staggered position and it will be appreciated that material being agitated by the blade 61 will drop off the blade at its lower edge 63, which is its drop-off point. The material will then stay in a fixed position until rotation of the rotor 60 results in the same material being contacted by the blade 62. This constitutes its pick-up point. Thus, the angular disposition of the flat blades 61 and 62 is 90° and each particle of material will be contacted four times for every revolution of the rotor 60.

The concept of 90° located blades and four wipes per revolution implies that the blades 61,62 are arranged perpendicularly along the axis of the rotor 60. In many cases the blades 61 and 62 would extend over the complete length of the rotor 60 without any interruption. In such cases agitation takes place between the tip of the rotor and the interior wall of the thin-film evaporator.

It is possible, however, to use rotor blades which are not completely vertically oriented. Referring to FIG. 6b, therefore, rotor blades 71,72 are again disposed on a central rotor shaft 70. In this case, however, the rotor blades have inclined lower edges. The tops of the rotor blades are therefore arranged at 90° angles as shown by the angle 73 generated between the upper edges of the blades 71 and 72. However, material being wiped by the blade 71 will be moved downwardly to leave the blade at its lower edge 74. In this case, the angle 75 between the drop-off point of the blade 71, i.e. edge 74, and the pick-up point of the blade 72 is less than 90°. By dividing the angle 75 into 360° a notional number of rotor blades per rotor can be generated. Thus, if the angle 75 is 75° then there will be a notional 4.8 blades per rotor. Thus, the notional number of blades per rotor can be increased either by including more sets of rotor blades disposed around the rotor or by angling the rotor blades so that the drop-off point for one rotor blade is less than 90° before the pick-up point for the next rotor blade.

It has now unexpectedly been discovered that by reducing the angle between the drop-off point for one rotor blade and the pick-up point for the next rotor blade to engage that material, significant increases in productivity can be obtained in the thin-film evaporator and, more importantly, the increases in productivity can be obtained whilst reducing the total absorbed power required to produce each kg of processed material.

Tables 1, 2 and 3 below show the effect of varying the average number of blade sets on product output versus rotor speed for a thin-film evaporator having an effective surface area of 5.5 m². Table 1 shows the rotor speed, product (solution) output, absorbed power, total absorbed power and total absorbed power in kilowatts (kw) divided by kilograms (kg) per hour output for a rotor having an average of 4.8 blade sets. Tables 2 and 3 show the same factors but for rotors having an average of 8.8 blade sets in the case of Table 2 and 12 blade sets in the case of Table 3.

TABLE 1

| 4.8 Blade Sets, 75° spacing | | | | |
|---|---|---|---|---|
| Rotor Speed (rpm) | Solution Output (kg/hr) | Absorbed Power (kw) | Total Absorbed Power (kw) | Total Absorbed Power (kw)/kg hour |
| 90 | 460 | 8 | 13 | 0.0283 |
| 110 | 530 | 9.7 | 19 | 0.0358 |
| 140 | 670 | 18.3 | 26.5 | 0.0395 |
| 180 | 765 | 24.9 | 35.5 | 0.0464 |
| 220 | 910 | 30.5 | 45.5 | 0.0500 |

TABLE 2

8.8 Blade Sets, 40.9° spacing

| Rotor Speed (rpm) | Solution Output (kg/hr) | Absorbed Power (kw) | Total Absorbed Power (kw) | Total Absorbed Power (kw)/kg/hr |
| --- | --- | --- | --- | --- |
| 93 | 735 | 20.7 | 26 | 0.0353 |
| 100 | 790 | 23.3 | 29 | 0.0295 |
| 105 | 840 | 25.0 | 31 | 0.0369 |
| 110 | 875 | 26.7 | 33 | 0.0377 |
| 120 | 950 | 30.1 | 37 | 0.0389 |
| 130 | 975 | 31 | 38.5 | 0.0395 |
| 140 | 1050 | 32.3 | 40.5 | 0.0386 |

TABLE 3

12 Blade Sets, 30° spacing

| Rotor Speed (rpm) | Solution Output (kg/hr) | Absorbed Power (kw) | Total Absorbed Power (kw) | Total Absorbed Power (kw)/kg/hour |
| --- | --- | --- | --- | --- |
| 100 | 1074 | 23.8 | 30 | 0.0279 |
| 130 | 1380 | 28.0 | 43 | 0.0312 |

The total absorbed power includes the power absorbed by the bearings and gears and inefficiencies in the electrical and mechanical system used to drive the thin-film evaporator. The absorbed power is deduced by operating the thin-film evaporator at the various speeds, but whilst empty, and determining the power output required to drive the thin-film evaporator itself. Thus, the absorbed power is the power required merely to form a solution of the cellulose in the solvent.

The particularly important figure is, however, the total absorbed power, as this is the factor which effects the true cost of operating the thin-film evaporator.

It will readily be appreciated that it is normally preferable from a mechanical viewpoint to operate equipment at a lower rather than a higher speed, because wear rates increase dramatically as speeds increase.

An immediate survey of the three tables indicates clearly therefore that by increasing the number of blade sets the total dope output in terms of kg per hour available by operating the thin-film evaporator at a constant speed increases dramatically. Thus, operating the thin-film evaporator with 4.8 blade sets at 140 rpm gives a total output of only 670 kg per hour. Operating the same thin-film evaporator with an average of 8.8 blade sets gives a dope output of 1,050 kg per hour, whereas using 12 blade sets even at a lower rotor speed of 130 rpm increases the dope output to 1,380 kg per hour.

Although, therefore, it is important that the output of dope can be increased by increasing the number of blade sets it has unexpectedly been discovered that this distinct advantage (meaning that fewer thin-film evaporators are required to produce a given dope output) is also accompanied by a decrease in the power required to produce material at higher production rates.

Figure 7:
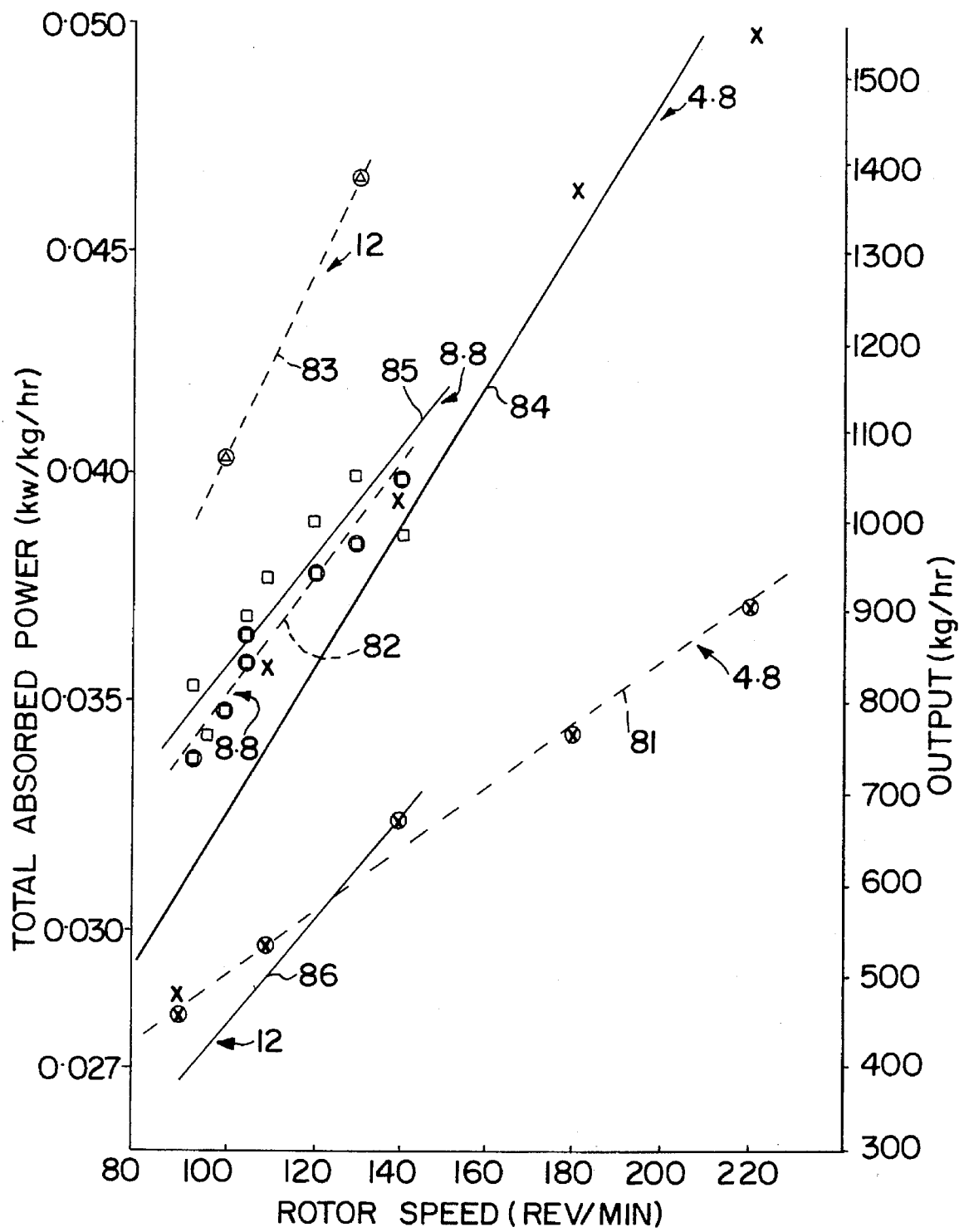
FIG. 7 is a graph of energy consumption and capacity against rotor speed.

This may most easily be seen by referring to the accompanying graph, FIG. 7, which is a graphical representation of the information set out in Tables 1 to 3 above.

In the graph the rotor speed is shown on the x axis as varying between 80 and 220 revolutions per minute. On the left-hand y axis the total absorbed power in kw per kg per hour of dope output is shown. On the right-hand y axis is shown the output in kg per hour. Comparing first the dotted lines 81, 82 and 83, these show the total output for a thin-film evaporator having 4.8 blade sets, 8.8 blade sets and 12 blade sets, respectively. It can be seen that very considerable improvements in productivity are to be obtained by increasing the number of blade sets. In FIG. 7 the crosses within circles represent the total absorbed power per kg per hour for the 4.8 blade-set thin-film evaporator, the squares within circles show the same factor for the 8.8 blade-set thin-film evaporator and the triangles within circles show the same factor for the 12 blade-set thin-film evaporator.

The solid lines 84, 85 and 86 in FIG. 7 show the power consumption in kw per kg per hour of dope output, i.e. the unit power consumption. It can first be seen that the 12 blade-set thin-film evaporator not only has the highest productivity (line 83) but also produces dope at the lowest power consumption in terms of kw per kg per hour (line 86). The line 84 shows that the unit power consumption for the 4.8 blade-set rotor is lower at lower rotational speeds than for the 8.8 blade-set rotor (line 85). The lines cross, however, showing that as the rotational speed and output increases the 8.8 blade-set rotor becomes more efficient.

Figure 8:
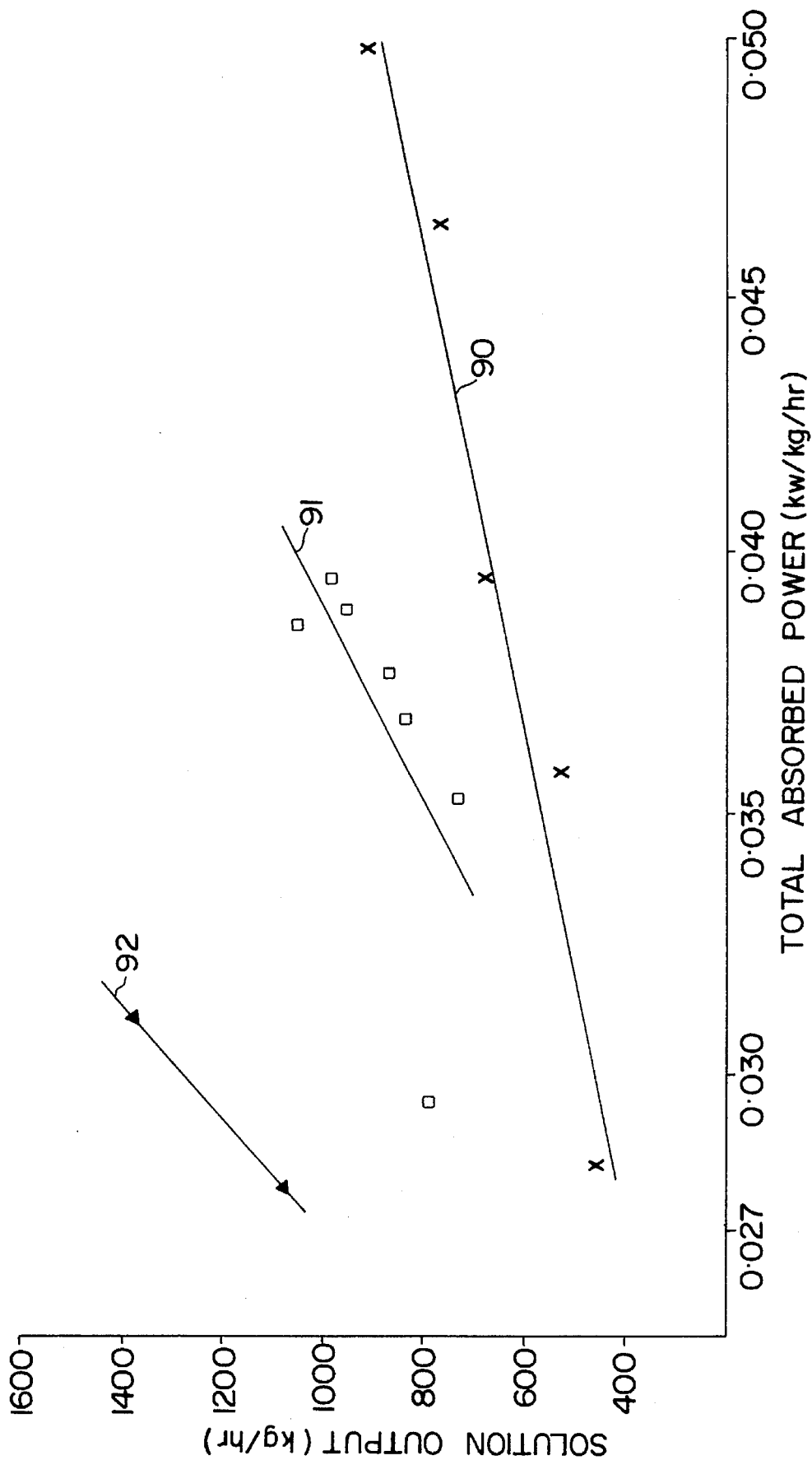
FIG. 8 is a graph of energy consumption against capacity.

To enable the information shown graphically in FIG. 7 to be used to derive the actual power consumption per kg/hour of product manufactured it is necessary to prepare a further graphical representation as shown in FIG. 8. Although the information on power compared to productivity is available in FIG. 7 it is more easily understood in FIG. 8. FIG. 8, therefore, is a graph of solution output in kg per hour on the y axis against power consumption in terms of total absorbed power in kw per kg per hour of output on the x axis. Line 90 is the line graphically representing the output of the rotor having an average of 4.8 blade sets, line 91 is the average 8.8 blade-set rotor line and line 92 is the average 12 blade-set rotor line.

It can first be seen that for any given power input into the system the production of dope is dependent on the number of rotor blades on the rotor. Thus, reading along the x axis to any given power input in terms of total absorbed power per kg per hour of dope produced, the greater the number of rotors the higher the position of the line joining the various points and hence the higher the total output of dope. Thus, inputting between points 0.027 and 0.030 kw hours per kg would give a productivity of about 400 kg per hour in the case of a 4.8 blade-set rotor, about 600 to 800 kg per hour in the case of an 8.8 blade-set rotor and about 1000 to 1200 kg per hour in the case of a 12 blade-set rotor thin-film evaporator.

Figure 9:
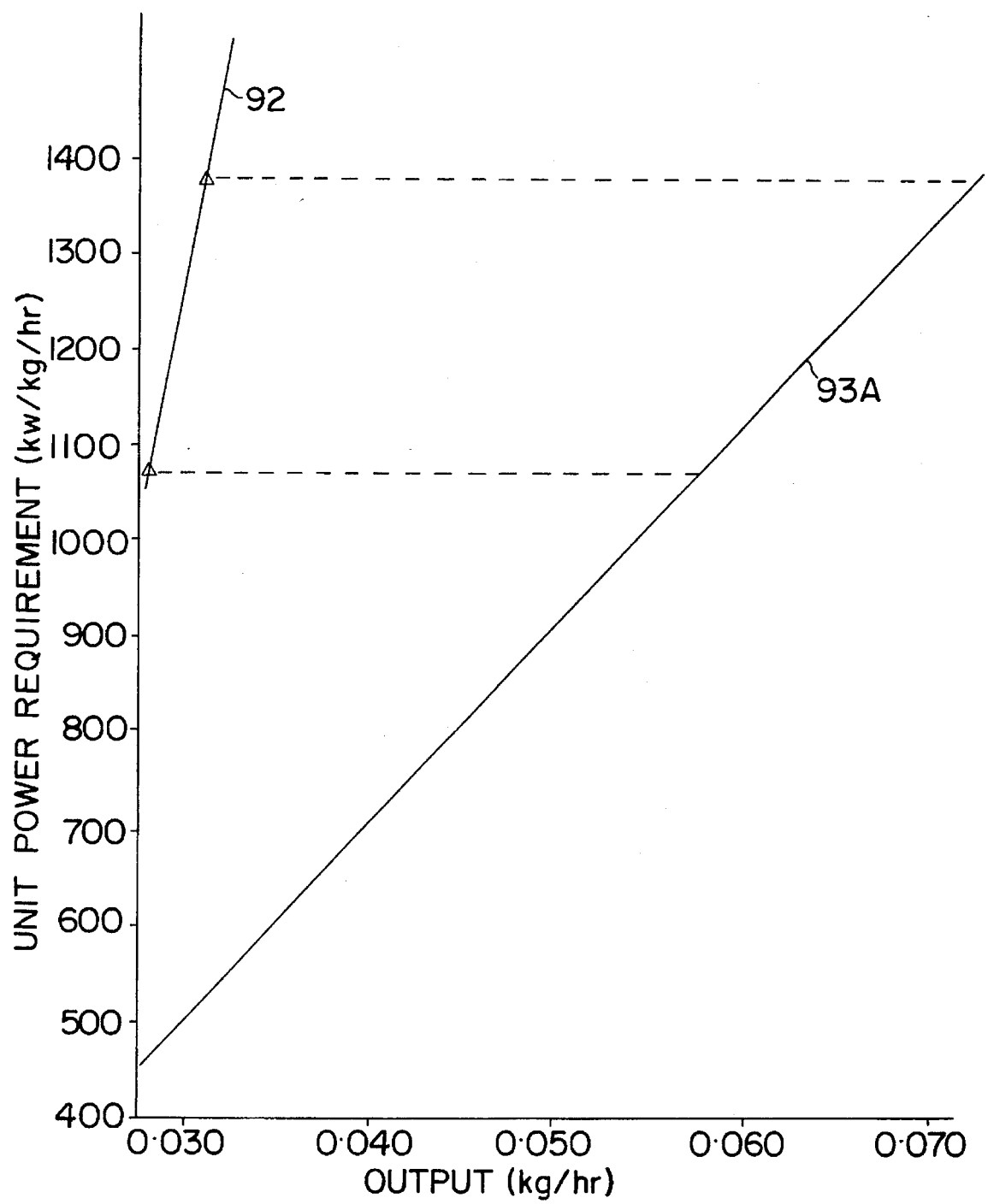
FIG. 9 is an extended graph of energy consumption against capacity, derived from FIG. 8.

The information in FIG. 8 has to be extrapolated to give the full implication of the improvement to be obtained by moving from a 4.8 blade-set rotor to a 12 blade-set rotor. FIG. 9 is such an extrapolation. FIG. 9 is again a graph of output in kg/hr on the y axis versus unit power requirement in kw/kg/hr on the x axis. Line 92 is the same as in FIG. 8, but line 93A is line 93 from FIG. 8 extended to higher outputs. The actual measured points are shown on the graph and are derived from Tables 1 and 3. From FIG. 9 it can be seen that a 12 blade-set rotor can produce 1075 kg/hr output at a unit energy requirement of 0.028 kw/kg/hr, whereas the 4.8 blade-set rotor would require a unit energy input of 0.0575 kw/kg/hr, over twice as much energy. Similarly the 12 blade-set rotor can produce 1380 kg/hr at a unit energy requirement of 0.031 kw/kg/hr, whereas the 4.8 blade-set rotor would require an energy input of about 0.0725 kw/kg/hr, considerably more than twice the unit energy requirement.

For larger units, of, for example, 1.40 m diameter, up to 20, 24, 26, 28, 30, 32, 34 or even more blade sets can be used, with operating pressures in the range 50 to 250 millibars or 35 to 100 mb and exit temperatures of 100°–110° C.

It has unexpectedly been discovered, therefore, that increasing the number of wipes of the rotor blade on the premix by increasing the rotational speed of the rotor does not increase the capacity of the apparatus to form a true solution in the same way as increasing the number of blades.

Given that increasing the number of blades results in an increasing number of wipes per minute experienced by the premix as it passes through the solution, it might have been thought that this would be equivalent to increasing the rotational speed of the rotor. However, this has been found not to be the case and increasing the number of blades around the rotor still gives a good-quality product in terms of a clear solution with insignificant amounts of undissolved cellulose in the solution.

It has further been discovered that by using larger numbers of blades, the thin film evaporator produced good quality solution even when operating slowly, thus enabling the unit to be slowed down and produce smaller quantities of solution for times when less solution is required.

We claim:

1. In a method of forming a solution of cellulose in a tertiary amine N-oxide which comprises the steps of:

(a) forming a premix of a tertiary amine N-oxide, water and cellulose, (b) heating the premix under a pressure lower than atmospheric in a vertically mounted thin-film evaporator having a heated inner surface and a central shaft with paddle blades disposed along the shaft so that, on rotation of the shaft, material in the evaporator will be contacted by a plurality of blades annularly spaced around the shaft, (c) evaporating the water from the premix to a level such that the cellulose forms a solution in the amine oxide and (d) removing the solution form the thin-film evaporator, wherein the improvement consists essentially of using a heated inner surface with an area in the range of 1 $m^2$ to 125 $m^2$, rotating a rotor such that the tips of the blades have a linear speed of 2.5 m/sec to 8 m/sec, ensuring a circumferential spacing between the tips of adjacent blades in the range of 65 mm to 175 mm, applying a vacuum in the range 25 millibars to 100 millibars and heating the heated inner surface to a temperature such that, under the conditions of applied vacuum, the solution is removed at a temperature in the range 90° to 135° C.

2. A method as claimed in claim 1 wherein the surface area is in the range 10 $m^2$ to 125 $m^2$, the circumferential spacing between the tips of adjacent blades is in the range of 75 mm to 150 mm, and the blades are rotated to have a linear speed at their tips in the range 2.5 m/sec to 5 m/sec.

3. A method as claimed in claim 1 wherein the tips of the blades have a linear speed in the range 2.5 to 4.7 m/sec.

4. A method as claimed in claim 1 wherein the solution is formed at an exit temperature in the range 100° C. to 115° C.

5. A method as claimed in claim 1 in which the premix is fed into the thin film evaporator at a temperature between ambient and 95° C.

6. A method as claimed in claim 1 wherein the rotor has blades located at intervals of 5° to 15° or 5° to 10° around the circumference of the rotor.

7. A method as claimed in claim 1 in which the solution contains 7% to 35% by weight cellulose, 15% to 4% water and the balance amine oxide.

8. A method as claimed in claim 1 in which the blades are spirally arranged about the shaft with adjacent blades being angularly and axially spaced from one another.

9. A method as claimed in claim 1 in which some of the plurality of blades are inclined so as to force material downwards through the thin-film evaporator.

* * * * *